Patented Sept. 26, 1933

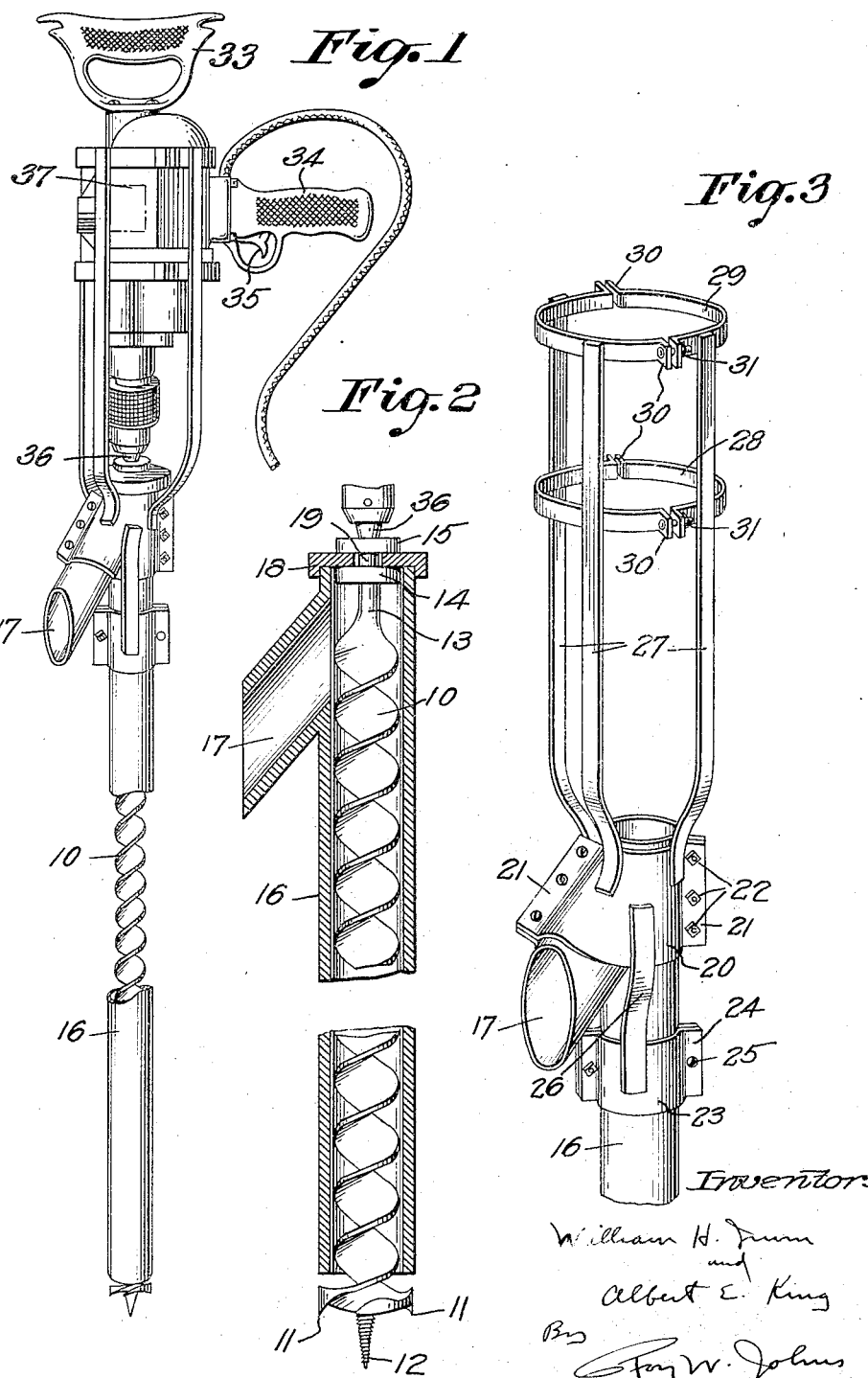

1,927,871

UNITED STATES PATENT OFFICE 1,927,871

SAMPLING DEVICE

William H. Irwin and Albert E. King, Chicago, Ill., assignors, by mesne assignments, to Industrial Patents Corporation, Chicago, Ill., a corporation of Delaware Application May 15, 1931. Serial No. 537,656

3 Claims. (Cl. 83—15)

This invention relates to a new and improved tool having usefulness for many different purposes but particularly adapted for use in taking samples of bulk materials, such as for instance, fertilizers, grain and like materials.

The utility of this device may be better understood from a brief reference here to its function and operation when used in connection with taking samples of materials such as fertilizers and the like.

The tool of this invention comprises briefly, a combined boring and conveying screw mounted for rotation in an encasing conveying tube with means for effecting rotation of the boring and conveying screw. The tool may be conveniently made up as a portable device so that it may be readily handled and conveniently placed to perform the desired work.

In many instances, it is desirable to take samples of various materials, such as fertilizers, grain and the like, and as a matter of illustration, if a quantity of such material were stored in a bin, receptacle or other place so that the material is inaccessible, the tool of this invention may be employed with great assistance for segregating and approaching a portion of the material and conveying the material to a convenient, accessible location.

With the above understanding of the utility of this tool, the various uses to which it may be put will be better appreciated by those skilled in the various arts in which its use may make for advantage.

The underlying principle of this tool is to provide a combined boring and conveying rotary element such as a screw providing an auger mounted in a sleeve or tube whereby the screw will perform the joint action of drilling into the material and segregating a portion thereof by conveying the portion removed by the boring action, to a location where it is deposited by the action of the screw, readily accessible to the operator.

In some instances, such as with grain or other loose flowable material, the conveying action is paramount and the boring action less important, but in other instances where hard or compacted materials are handled, the boring action of the screw will offer a decided advantage in effecting the initial segregation of the material from the mass from which it is to be taken.

An object of the present invention is to provide a tool of the above described character which is simple in construction, efficient in operation and relatively inexpensive to manufacture and maintain.

It is a further object to provide such a tool which may be portable or otherwise and provided with means for rotating the boring and conveying screw, such as for instance, an electric motor, air motor or other suitable power means, or if desired, an ordinary crank for turning the screw manually.

These and other objects not specifically enumerated, will readily appear as the following description proceeds. The following description makes reference to the accompanying drawings and relates to one preferred embodiment of this invention which is given merely by way of illustration. The present disclosure being merely illustrative, should not be construed as limiting the invention in any respect as the scope thereof should be determined from the appended claims and an appreciation of the advantages which the invention produces as embodied in the illustrated form.

In the drawings, Figure 1 is an elevational view of a tool constructed in accordance with the present invention;

Figure 2 is an enlarged cross sectional view showing the boring and conveying screw and the surrounding conveyor tube and outlet therefor; and Figure 3 is an enlarged elevational view showing the upper portion of the conveyor tube and the frame provided for mounting the electric motor for the screw.

In the present disclosure it will be noted that the invention is disclosed as embodied in a tool comprising a boring and conveying screw 10 which may be of any suitable construction but is here shown as provided with a single twist terminating at its lower end in cutting edges 11, and leading screw 12, all of usual construction of the type usually employed for ordinary bits or drills for boring purposes. The upper end of the screw 10 is provided with a shaft 13 having collars 14 and 15 rigidly secured thereto. Surrounding the screw 10 and having a relatively close fit therewith for the conveyor tube 16 which is made up of some suitable material having the outlet nozzle 17 at its upper end adjacent the location of the upper turns of the conveyor screw.

The cutting edges 11 parallel and substantially align with the exterior longitudinally extending outer surface portion of the conveyor tube 16 and also extend longitudinally at opposite sides of—both above and below—the outermost ends of the forward lower ends of the turns to which the cutting edges correspond whereby by the rotation of the boring and conveying screw an effective boring and cutting operation is realized that permits a ready following of the conveyor tube into the bored space as produced and the boring operation is facilitated because of the cutting edges having the radius movement mentioned and because there is a substantial longitudinal length of the cutting edge both above and below the forward radial cutting edges of the lowermost turns.

The upper end of the tube 13 is closed by a cap 18 which is suitably secured thereon, and provided with a central opening 19, for accommodating the shaft 13. In assembling, the collar 14 may be fixed to the shaft of the screw, after which the screw is inserted in the tube from the lower end.

After the screw is in position with the upper end of the shaft slightly projecting, the upper collar 15 may be secured thereto to hold the screw against axial displacement.

As a means for mounting a power unit, such as an electric motor as shown in Figure 1, an adapter is employed, and in which adapter brackets 20 are provided suitably spaced for engagement with the upper end of the tube and held by means of flanges 21 and nuts and bolts 22. If it is desirable to provide additional strength, another bracket 23 may be provided below the outlet of the tube likewise provided with flanges 24 and nuts and bolts 25 for clamping the brackets in engagement with the tube.

In the form illustrated, straps 26 are provided extending between the upper and lower brackets, suitably attached thereto as by welding. Extending upwardly from the upper clamp 20 are three frame bars 27 preferably mounted and shaped substantially as shown. Toward the upper end of these bars, frame clamp rings 28 and 29 are provided having flanges 30 for co-operating engagement whereby with suitable means, such as the nuts and bolts 31, detachable, split clamping rings are provided for holding the power unit.

As above mentioned any suitable power means may be employed but in the present disclosure, as shown in Figure 1, an electric motor is provided of a conventional type having handles 33 and 34 with switch trigger 35, of the general construction shown. A power shaft 36 extends downwardly from the motor casing 37 and is provided with a suitable squared end fitting in a cooperating socket in the collar 15. From this arrangement, it will readily appear that the motor is removably mounted in the frame with the lower end of the power shaft in driving engagement with the shaft of the screw so that the entire tool constitutes a unitary device which is portable in character and capable of being carried and operated by engagement with the handles 33 and 34.

In use, it is merely necessary to provide the proper electrical connection for the motor, after which the tool may be carried by the handles 33 and 34 and manipulated in a manner quite similar to that of a pneumatic drill, hammer or similar mechanism.

The device is very compact and light in weight, whereby it can be readily handled and moved into relatively small spaces or projected into relatively small openings. It is of course understood that the boring and conveying screw and cooperating conveying tube may be as long as desired for the particular use intended, whereby in operation it is merely necessary to project the tube into contact with the material operated upon while holding the tool by the handles as described.

When the tool is so positioned, the trigger switch may be operated whereby to set the boring and conveying screw in rotation. Immediately the screw penetrates the material, and continues to do so as long as the tool is thrust there-against. When the material is removed from the bored hole it is simultaneously conveyed up the tube by the screw and is fed out of the outlet opening 17, which may be disposed at any location convenient to the operator. The material may then be collected for the purpose intended.

We claim:

1. A device of the character described comprising a frame and a combined boring and conveying screw providing an auger mounted for rotation in said frame, said frame comprising a conveying tube in surrounding association with a body section or conveying portion of said auger, said auger being disposed so that its lowermost end is exposed below the lower end of the conveying tube and has a cutting end which is of greater diameter than that of the body section, said device being characterized in that the forward or exposed cutting end of the auger has longitudinally extending cutting edges that parallel and align with the outer surface portions of the longitudinally extending tube, and which longitudinally extending cutting edges have portions that extend above and below the outermost ends of radially extending cutting edges at the foremost end of the turns of the auger.

2. A device of the character described wherein a motor having a trigger control is employed for supplying power during the operating of the device, which device comprises in combination a combined boring and conveying screw providing an auger, a conveyor tube or casing, and an adapter by which the motor can be held in place in respect to the conveyor tube and auger, which auger comprises a body section of screw-like formation providing a main conveying section, a cutting section at the lower forward end of the body section, and a shaft that extends upwardly from the main conveying section, the upper end of which shaft receives the power from the motor when the latter is in place during the operating of the device, said conveyor tube being located so that it surrounds the auger conveying section and constructed so that bored material conveyed upwardly by said conveying section can be delivered from within the upper portion of said tube, which adapter comprises a lower securing member that is secured to the upper end of the conveyor tube, upwardly extending frame bars the lower ends of each of which is fixedly secured to said lower securing member, and vertically spaced upper and lower clamping bands providing rings, the upper of which bands is secured to the uppermost ends of the upwardly extending frame members and the lower of which bands is secured to an intermediate section of the upwardly extending frame members, each of which clamping bands or rings are provided with screw means whereby at will said rings can be employed to detachably secure in place the motor for operating the device.

3. A device of the character described having a combined boring and conveying screw providing an auger, a conveyor tube or casing, and an adapter by which a motor can be held in place in respect to the conveyor tube for operating said auger, said adapter comprising upwardly extending frame bars the lower ends of each of which is suitably secured to the conveyor tube and adjacent the upper end of said conveyor tube, and vertically spaced upper and lower clamping bands providing rings, the upper of which bands is secured to the end portions of the upwardly extending frame members and the lower of which bands is secured to intermediate sections of the upwardly extending frame members, each of which bands or clamping rings are provided with means whereby at will said rings can be employed to detachably secure in place the motor for operating the device.

WILLIAM H. IRWIN.
ALBERT E. KING.